United States Patent [19]

Sastra et al.

[11] Patent Number: 4,739,548
[45] Date of Patent: Apr. 26, 1988

[54] METHOD OF MANUFACTURING MAGNETIC HEAD CORES

[75] Inventors: Budiman Sastra; Jan H. J. Mengelers, both of Eindhoven, Netherlands

[73] Assignee: U.S. Philips Corporation, New York, N.Y.

[21] Appl. No.: 855,526

[22] Filed: Apr. 23, 1986

[30] Foreign Application Priority Data

Apr. 26, 1985 [NL] Netherlands .......................... 8501201

[51] Int. Cl.$^4$ ............................................. G11B 5/127
[52] U.S. Cl. ...................................... 29/603; 225/93.5
[58] Field of Search ........................... 29/603; 360/119; 225/93.5, 2

[56] References Cited

U.S. PATENT DOCUMENTS

| | | | |
|---|---|---|---|
| 2,146,373 | 2/1939 | Keier | 225/93.5 |
| 2,836,881 | 6/1958 | Pollock | 29/603 |
| 2,864,013 | 12/1958 | Wood | 29/25.35 |
| 3,104,455 | 9/1963 | Frost | 29/603 |
| 3,581,247 | 5/1971 | Belford et al. | 29/25.35 |
| 3,797,757 | 3/1974 | Marshall | 225/93.5 |
| 3,807,042 | 4/1974 | Braitberg et al. | 29/603 |

FOREIGN PATENT DOCUMENTS 2715352 10/1978 Fed. Rep. of Germany ........ 29/603

Primary Examiner—P. W. Echols
Attorney, Agent, or Firm—F. Brice Faller

[57] ABSTRACT

A plurality of magnetic head cores is cut from a preprocessed ferrite core block having a gap formed by means of a fracture method. To this end the core block is notched on a line along which the gap is to be formed. Subsequently the core block is subjected to a load (tensile stress) until it breaks on the line. A non-magnetic material in a liquid form is provided between the fracture faces which are kept at a desired distance from each other until the material has cured. In a preferred method the core block consists of a first sub-block having a series of yokes and a second sub-block bonded thereto to define the winding apertures. This permits use of a high grade ferrite only at the gap, and further permits winding the limbs of the yoke prior to bonding.

9 Claims, 3 Drawing Sheets

METHOD OF MANUFACTURING MAGNETIC HEAD CORES

BACKGROUND OF THE INVENTION

The invention relates to a method of manufacturing magnetic head cores in which a plurality of magnetic head cores is cut from a preprocessed ferrite core block having a gap.

A method of this type is known from Netherlands Patent Specification 149,020, to which U.S. Pat. No. 3,402,463 corresponds. This Patent Specification describes a bulk manufacturing method in which first the side faces of two ferrite sub-blocks one of which accommodates a winding aperture are lapped Quartz is then sputtered on the side faces thus preprocessed and the sputtered faces of the sub-blocks are cemented together with the aid of glass. A plurality of magnetic head cores is cut from the assembly so obtained, each having a glass gap. During one of the further manufacturing steps the required electrical turns are wound in the winding aperture. Lapping of the side faces is a costly process, because it requires great accuracy and is time-consuming. Moreover, a drawback of processing surfaces constituting the gap faces in the finished head is that a damaged layer is formed on the gap faces. The effective gap length is therefore difficult to check. A further drawback of the known method is that the finished magnetic head cores consist of two halves cemented together with the aid of a thin glass layer so that they are mechanically weak.

SUMMARY OF THE INVENTION

An object of the invention is to provide a bulk manufacturing method which is inexpensive, leaves the gap faces intact and leads to a mechanically strong magnetic head core.

To this end the core block is provided with a gap by a method in which the core block is first notched on a line along which the gap is to be formed. The core block is then subjected to a load until it breaks on the line and, finally, a non-magnetic material is provided between the fracture faces while keeping them spaced at a desired distance from each other.

By considering the gap in a magnetic core manufactured in accordance with the invention to be a defined crack, a technology can be developed which is fast, continuous, inexpensive and accurate.

Under normal ambient conditions a defined crack can be created in a (monocrystalline) ferrite block with the aid of simple thermal, mechanical or ultrasonic means, When there is a brittle fracture, the fracture faces constitute a very accurate equidistant gap, the length of which can be adjusted by applying a mechanical load.

This "Fracture" technology is found to be extremely suitable for inexpensive and accurate bulk manufacturing of magnetic head cores.

To fill the gap, a material in liquid form such as epoxy resin is allowed to penetrate between the spaced fracture faces, which material is subsequently allowed to cure. However, the use of glass is alternatively possible.

The load applied to create the crack is generally a tensile stress.

The tensile stress can be applied by heating locally narrowly bounded areas of the line for a short period of time, immediately followed by cooling them. The latter, thermal method is based on what is referred to as the micro-thermo-shock technique. In this technique a controlled fracture in a flat plate can be realized by means of thermal stresses resulting from a jet of hot air, followed by a similar jet of cold air.

Making a gap in a magnetic head by means of a fracture process is known per se from U.S. Pat. No. 2,836,881. In accordance with the known fracture process the initial material is a single magnetic head core in which a deep V groove is provided, whereafter a fracture is produced in a thin core part facing the V groove by means of a mechanical load, and a foil is subsequently provided in the fracture. The known fracture process has little in common with the method according to the invention, in which magnetic head cores are cut from a core block already provided with a gap.

Within the scope of the invention the core block may be (pre)formed in different manners. In accordance with a first method the ferrite core block, which may have a prismatic shape, is previously provided with an eccentric bore in the longitudinal direction. The term eccentric bore, as used herein, will be understood to mean a bore offset from the center of the core block. In that case the block is notched at its weakest cross-section and the gap is formed by breaking during a subsequent stage. Finally a plurality of magnetic cores, each being separately wound, is cut from the core block, each core thus being provided with a gap.

In accordance with a second method the ferrite core block is composed of two sub-blocks, the first sub-block being preformed with a plurality of U-shaped yokes whose limbs are provided with coils, the second sub-block being bonded to the limb extremities of the yokes of the first sub-block. In this case the gap is formed in the second sub-block by means of a fracture process after the block has been bonded to the first sub-block.

When this method is used the cross-section of the second sub-block is preferably previously constricted at the area where the gap is to be formed.

An advantage of the second method over the first method is that the coils need not be provided by threading the turns through a winding aperture for each core, but that previously made coils can either be slid on the limbs of the core yokes, or all yoke limbs can be machine-wound simultaneously.

A plurality of different methods is applicable to apply a load, or tensile stress, on the core block to form the desired crack.

When the gap is formed, it is opened as far as is required to realize the desired gap length and the non-magnetic gap filler is provided. This may be, for example, an epoxy penetrant. The gap may be opened, for example, by heating the core block at an area located opposite the gap.

DETAILED DESCRIPTION OF THE INVENTION

Figure 1:
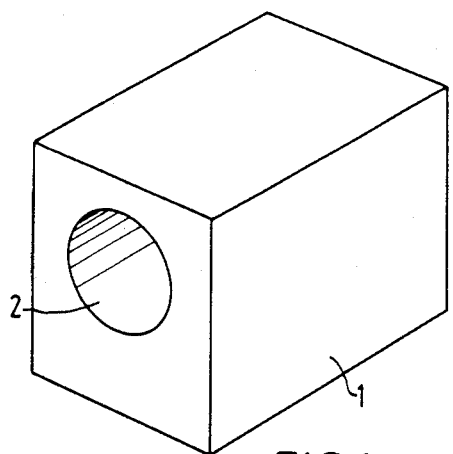
FIGS. 1–6 show a plurality of stages of a method of manufacturing magnetic head cores by means of a fracture process.

FIG. 1 shows a core block 1 of monocrystalline MnZn ferrite in which an eccentric bore 2 is provided in the longitudinal direction. As used herein the word "eccentric" means that it is not located at the center of the block.

Figure 2:
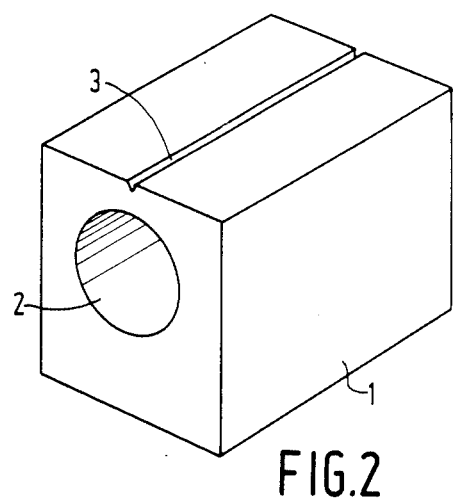

A notch 3 is provided at the weakest cross-section, likewise in the longitudinal direction (FIG. 2).

A tensile stress at the tip of the notch 3 causes the desired crack growth. The desired local stress may be realised in any one of the manners shown in Figures 3a–3e and now to be described.

Figure 3:
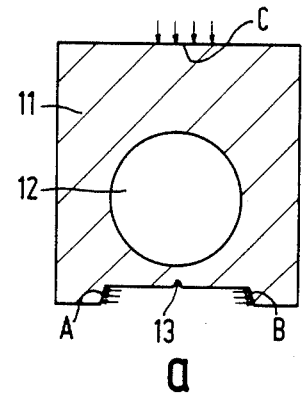
Figure 3:
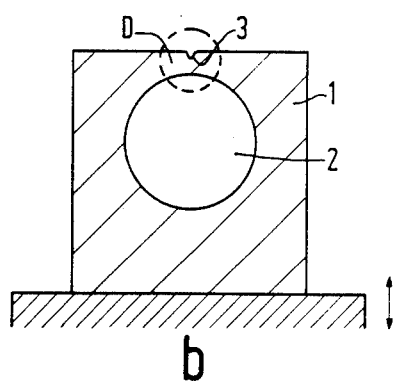
Figure 3:
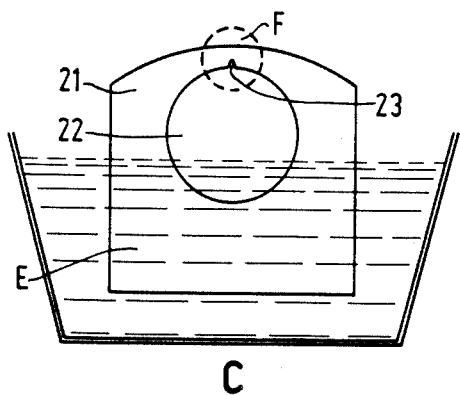
Figure 3:
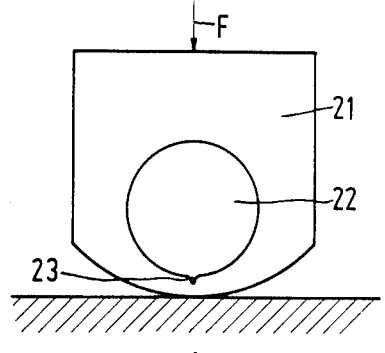

First a triangular bending load may be applied (FIG. 3a). In this method forces are applied in mutually opposite directions (for example, with the aid of a wedge) on either side of a recessed notch 13 at areas A and B and a load in a direction transverse thereto (for example, with the aid of a hold-down wheel) on a block 11 having an eccentric bore 12.

Next, ultrasonically a rapidly alternating bending load is applied to an area D where the notch 3 is provided (FIG. 3b).

Alternatively, the stress may be applied thermomechanically (FIG. 3c). An area E of a block 22 having an eccentric bore 23 opposite the constricted cross-section is heated, whilst the area F of the constricted cross-section is cooled;

In another method a Hertze load is exerted (FIG. 3d) As in the method of FIG. 3c, a notch 23 is provided on the inside of the bore 22.

Figure 3E:
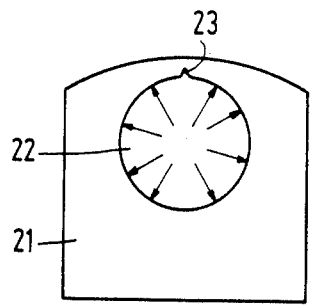
Figure 4:
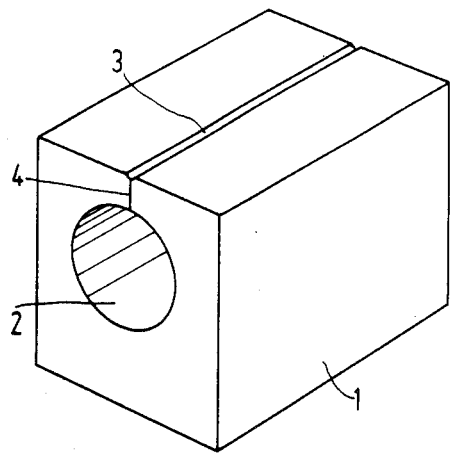
Figure 5:
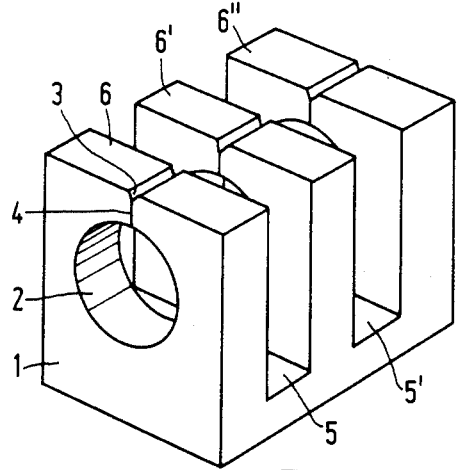

Finally, an internal pressure may be applied (FIG. 3e). As soon as a fracture 4 is created in the core block 1, it can be filled up, for example, with an epoxy resin (FIG. 4). The core block 1 thus provided with a gap 30 may be provided with serrations 5, 5' etc. to realize separate magnetic head cores 6, 6', 6'' etc. (FIG. 5)

Figure 6:
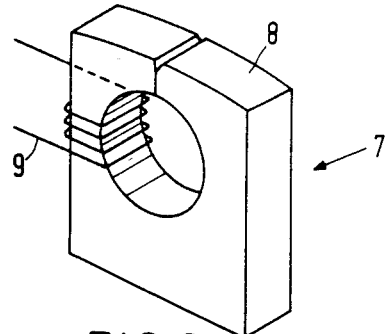

FIG. 6 shows a magnetic head core 7 having a tape contact face 8 and an electric winding 9.

FIGS. 7–12 illustrate an alternative method of realizing a magnetic head core having a gap formed by means of a fracture process.

Figure 7:
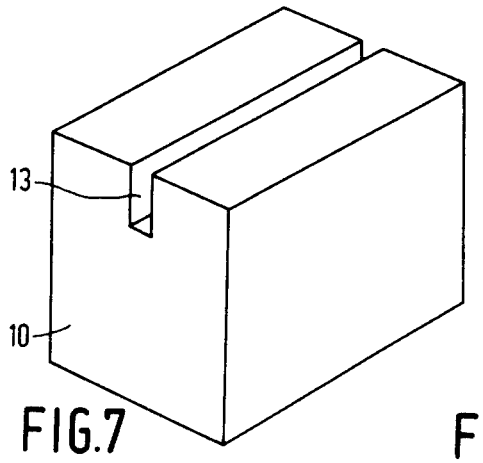
FIGS. 7–12 show a plurality of stages of an alternative method of manufacturing magnetic head cores by means of a fracture process.

First a ferrite prismatic block 10 is provided in its longitudinal direction with a shallow serration 13 (FIG. 7). This serration 13 will eventually constitute the winding aperture in the separate cores to be cut from the block 10.

Figure 8:
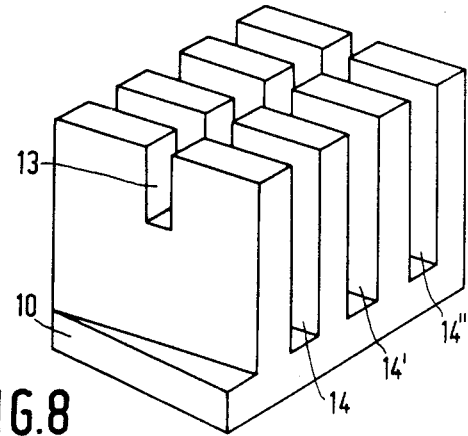
Figure 9:
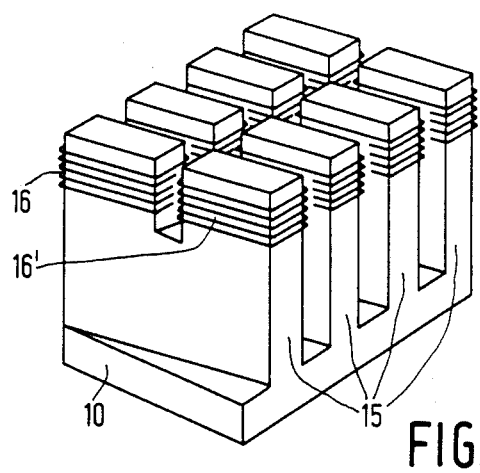
Figure 10:
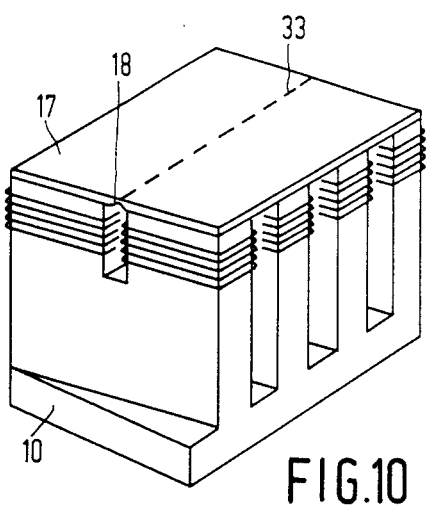

Subsequently the block 10 is provided with a series of serrations 14, 14', 14'', etc. set at an angle, for example 75°, to the serration 13 in the longitudinal direction (FIG. 8). In this manner a series of interconnected horseshoe-shaped yokes 15 is formed. Both limbs of each horseshoe-shaped yoke are provided with coils 16, 16' etc. (FIG. 9). Then the block 10 is magnetically short-circuited by covering the assembly with a flat block 17 of monocrystalline MnZn-ferrite having a thickness much smaller than the other dimensions of block 10. Block 10 and block 17 are bonded by means of a thin adhesive layer which does not cause a noticeable magnetic barrier (FIG. 10). The block 17 may be previously provided with a constricted cross-section 18 at the area where a gap is to be formed.

Figure 11:
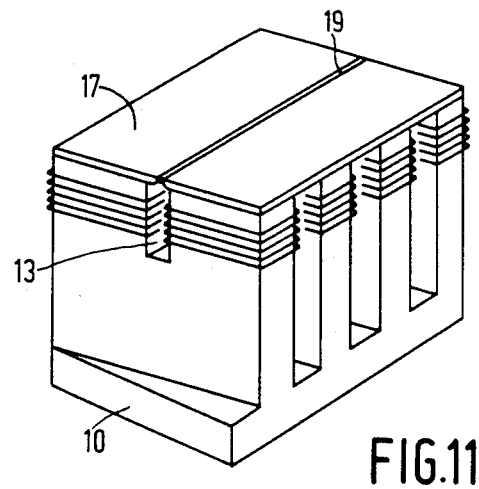

Subsequently a crack 19 is created over the winding aperture 13 across the length of the block 17 by means of a fracture mechanism (FIG. 11).

The fracture faces may be separated until a gap having a desired gap length is formed by, for example, unilateral heating of the assembled core block 10. The gap length may be, up to 0.5 μm. This gap may be filled with a penetrant in this condition (FIG. 11).

Figure 12:
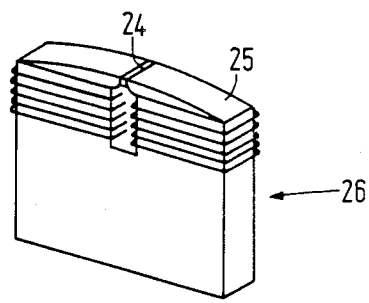

After a tape contact face 25 has been provided, the separate cores 26 provided with a transducing gap 24 may be split up (FIG. 12).

The stages shown in FIGS. 7 and 8 may be considered as separate stages in the production process. Dependent on the required surface quality of the "serrations", different processing techniques are possible for this purpose.

As for the stage shown in FIG. 9, the coils 16, 16' etc. may be slid in a wound condition over the limbs of the horseshoe-shaped yokes 15 or may be machine-wound thereon. As for the thin monocrystalline block 17 on which the tape contact face 25 is finally ground, the upper side of block 17 should have such a surface quality that a notch 33, to be provided at a later stage, has a dominant effect and can function as a crack initiator. It is preferable to previously provide block 17 on the side of the winding aperture 13 with a cylindrical groove in the longitudinal direction to constrict the cross-section 18 at the area of the final gap (FIG. 10).

The load to be exerted to realize the cracking process may be effected by uniformly heating the assembly 16, 17, followed by intense cooling exactly at the area of the constricted cross-section 18 and/or the notch 33.

Figure 13:
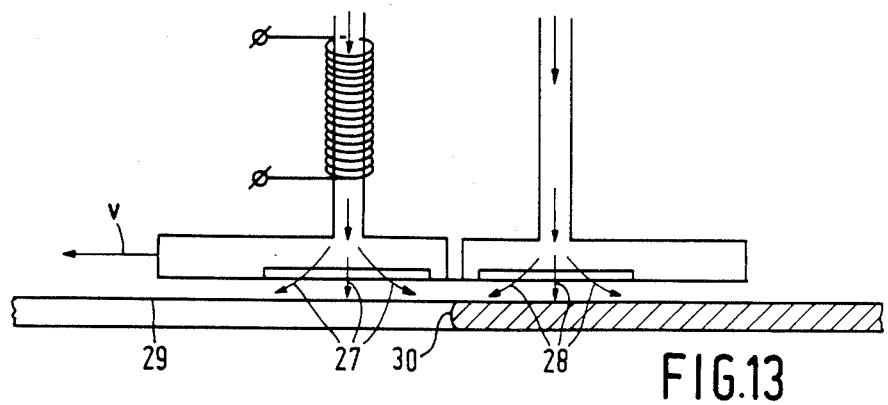
FIG. 13 illustrates the thermal cutting method.

An alternative cracking method is the use of the principle of what is referred to as the Micro-Thermo-Shock technique. Its principle is shown in FIG. 13.

By means of thermal stresses resulting from a jet 27 of hot air followed by a jet 28 of cold air a controlled cleavage-fracture process can be realized in a flat plate 29. The position and the rate of propagation of crack front 30 can be controlled dependent on both the temperature gradient across the thickness of the plate 29 and the direction of movement v of a device generating the air jets 27 and 28.

With respect to the method described with reference to FIGS. 7–12, the use of high-grade monocrystalline MnZn-ferrite is required only for the part of the core 26 comprising the gap 24. This means that only the thin block 17 need be of monocrystalline MnZn-ferrite. The thickness of this block 17 need not exceed 75 to 150μm. The greater part of the core 26 may consist of a different, less costly magnetic material.

Second, the possibility of mechanically winding the limbs of the yokes 15 before block 17 is bonded to block 10 results in an enormous saving of time and costs in the production process.

Generally it can be said that the invention leads to faster and less expensive manufacturing techniques for magnetic transducing heads for audio, data and video uses, and also t gaps in magnetic transducing head having very short gap lengths suited to rear or write even shorter wavelengths on a recording medium, for example, in vertical recording.

What is claimed is:

1. A method of manufacturing magnetic head cores in which said cores are cut from a ferrite core block provided with a gap, said method comprising the following steps:

providing a first ferrite sub-block preformed with a plurality of U-shaped yokes, each yoke comprising a pair of limbs, bonding a second sub-block to the limb extremities of the yokes of the first sub-block to form said core block, thereby defining a winding aperture between the limbs of each pair, providing said second sub-block with a notch along a line where said gap is to be formed, subjecting the core block to a load until it fractures along the line, thereby forming fracture faces bounding said gap, said gap being formed in the second sub-block after said second sub-block has been bonded to the first sub-block, providing a non-magnetic material between the fracture faces while keeping them spaced at a desired distance from each other.

2. The method of claim 1 wherein said notch is provided before bonding said second sub-block to said first sub-block.

3. The method of claim 1 wherein the limbs of the U-shaped yokes are provided with coils prior to bonding said second sub-block to said first sub-block.

4. The method of claim 1 wherein said notch is provided opposite said winding apertures.

5. The method of claim 1 wherein said second sub-block is provided with a cylindrical groove opposite said notch.

6. A method as claimed in claim 1, characterized in that the non-magnetic material is provided in liquid form between the fracture faces and is subsequently allowed to cure.

7. A method as claimed in claim 6, characterized in that the non-magnetic material is an epoxy resin.

8. A method as claimed in claim 1, characterized in that the load is a tensile stress.

9. A method as claimed in claim 8, characterized in that the tensile stress is applied by heating locally narrowly bounded areas of the line for a short period of time, immediately followed by cooling them.

* * * * *